(12) United States Patent
Hutchenreuther et al.

(10) Patent No.: US 6,672,177 B2
(45) Date of Patent: Jan. 6, 2004

(54) PROXIMITY SUPPRESSION SYSTEM TESTER

(75) Inventors: Alan J. Hutchenreuther, Southfield, MI (US); Philip A. Derosier, Berkley, MI (US); Kathleen M. Krause, New Lenox, IL (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/844,515

(22) Filed: Apr. 27, 2001

(65) Prior Publication Data

US 2002/0157450 A1 Oct. 31, 2002

(51) Int. Cl.⁷ .............................................. G01M 19/00
(52) U.S. Cl. ...................... 73/865.3; 73/865.6
(58) Field of Search .......................... 73/865.3, 865.6, 73/865.9, 866.4

(56) References Cited

U.S. PATENT DOCUMENTS 6,023,984 A * 2/2000 Mazur et al. ............... 73/865.3
6,035,728 A * 3/2000 Jost ........................... 73/12.01

FOREIGN PATENT DOCUMENTS

EP 1 033 564 A 9/2000

OTHER PUBLICATIONS

"Improving Head–Impact Protection", Automotive Engineering, Society of Automotive Engineers. Warrendale, US, vol. 104, No. 5, May 1, 1996, pp. 49–53, XP000591331, ISSN: 0098–2571.
Morschheuser K: "Airbag im Rahmenfahrzeug (Airbag in Heavy Class Vehicles)", ATZ Automobiltechnische Zeitschrift, Franckh'sche Verlagshandlung. Stuggart, DE, vol. 97, No. 7/8, Jul. 1, 1995, pp. 450–454, 456–457, XP000521274, ISSN: 0001–2785.
European Search Report for Application No. EP 02 00 9466 completed Aug. 6, 2002 (3 pages).

* cited by examiner

Primary Examiner—Max Noori
(74) Attorney, Agent, or Firm—Rader, Fishman & Grauer PLLC

(57) ABSTRACT

A system and method for testing an airbag proximity suppression system that includes a positioning system that controls movement of an occupant model and toward a suppression zone. A proximity sensor provides a first output signal indicative of when the occupant model actually enters the suppression zone by monitoring movement of a position marker. The airbag suppression system, the device under test, provides a second output signal indicative of when the airbag suppression system detects that the occupant model has entered the suppression zone. The timing difference between the first and second output signals is indicative of a performance factor of the airing suppression system.

23 Claims, 3 Drawing Sheets

PROXIMITY SUPPRESSION SYSTEM TESTER

FIELD OF THE INVENTION

The present invention relates generally to the field of automotive airbags, and more particularly to the field of proximity suppression systems for automotive air bags.

BACKGROUND OF THE INVENTION

Airbags are common safety features in many modern automotive vehicles. While airbags often are effective in protecting vehicle occupants during a crash, they have sometimes been argued to be potentially detrimental to children or other vehicle occupants who sit relatively close to the airbag door (normally installed inside of the vehicle steering wheel or dashboard). One argued potential cause of injuries is that most current airbags deploy with a certain predetermined amount of force. While the predetermined amount of force may be appropriate for most vehicle occupants, it may arguably be too great for children or other relatively small vehicle passengers who sit close to the vehicle dashboard. Airbags have also been argued to be potentially detrimental on occasion when the airbag is deployed and the vehicle passenger is not wearing a seatbelt. In such cases, the force of the vehicle deceleration is argued to cause the unbelted passenger to move too close to the airbag. To address these perceived problems, there have been efforts in the airbag industry to develop proximity suppression systems, which, based on various factors, either suppress the airbag deployment entirely or adjust the force with which it is deployed during a vehicle crash situation. Relatively advanced types of proximity suppression systems include Dynamic Proximity Suppression ("DPS") systems, which sense the nature of a vehicle occupant's movement toward the airbag during pre-impact deceleration of the vehicle and cause the airbag deployment to be adjusted based on such movement.

DPS systems include a sensing device to detect when a passenger moves into the "suppression zone." The "suppression zone" is a defined space in front of the vehicle steering wheel or dashboard into which the airbag deploys. The particular size and shape of the suppression zone depends on the specific airbag being used, the size and configuration of the vehicle's interior space, and the age and size of the vehicle passenger. FIG. 1 generally illustrates a passenger vehicle and a sample suppression zone 103 for a given airbag. Various DPS sensors detect when the vehicle passenger enters the suppression zone using a variety of methods. One system uses mathematical algorithms to estimate the time at which the vehicle occupant crosses into the suppression zone. Other methods may simply monitor the edge of the suppression zone and detect when the vehicle occupant has crossed over it. Regardless of the particular method used by the DPS system, an electronic airbag controller may suppress or adjust the deployment of the airbag upon impact based on the output of the DPS sensor.

These new DPS sensors require extensive testing before being approved for production. In particular, it is desirable to be able to measure the accuracy of the DPS sensor in determining when the vehicle occupant enters the suppression zone. DPS sensors that use mathematical algorithms to estimate when the vehicle occupant enters the suppression zone have a certain range of error associated with such estimations. Similarly, other types of DPS sensors may have certain lag times between the time when the vehicle occupant actually enters the suppression zone and when the DPS sensor detects such intrusion. In any event, it is desirable to be able to determine and evaluate these estimation errors and lag times. Further, for testing purposes, it is desirable to detect and identify the position of the vehicle passenger relative to the vehicle interior at the time when the DPS sensor detects suppression zone intrusion. A comparison of the actual suppression zone boundary relative to the position of the passenger at the time when the DPS sensor detects suppression zone intrusion is another measure of the accuracy of the DPS sensor.

Traditional vehicle testing methods would require that a vehicle sled test facility be used to simulate a pre-impact deceleration of the vehicle to evaluate the performance of a DPS sensor. The inventors hereof have recognized that it would be useful to have a flexible and accurate system and method for testing DPS sensors that would not require a vehicle sled test facility.

SUMMARY OF THE INVENTION

The invention relates to a testing system and method for testing airbag proximity suppression systems, and in particular, dynamic proximity suppression systems. The testing system includes a positioning system for moving an occupant model—an anthropomorphic dummy or any other geometric shape that substitutes for a human passenger—inside of a vehicle and toward the suppression zone. In a preferred embodiment of the invention, the positioning system generally comprises three perpendicularly-arranged rails that slide relative to each other to facilitate three-dimensional movement of the occupant model. The positioning system is controlled by an electronic controller, which is preferably a personal computer. A high-speed proximity detector monitors movement of the occupant model and produces a first output signal indicative of the point in time when the occupant model actually moves into the suppression zone. The DPS system, the device under test (DUT), provides a second output signal indicative of when the DPS system recognizes that the occupant model has entered the suppression zone. Based on a comparison of the first and second output signals, the electronic controller determines an error value or response time of the DPS sensor as well as the position of the occupant model at the time when the DPS sensor detects suppression zone intrusion. The error value and position information are performance factors that can be used to evaluate the performance level of the DPS sensor.

DETAILED DESCRIPTION OF A PREFERRED EMBODIMENTS OF THE INVENTION

Figure 1:
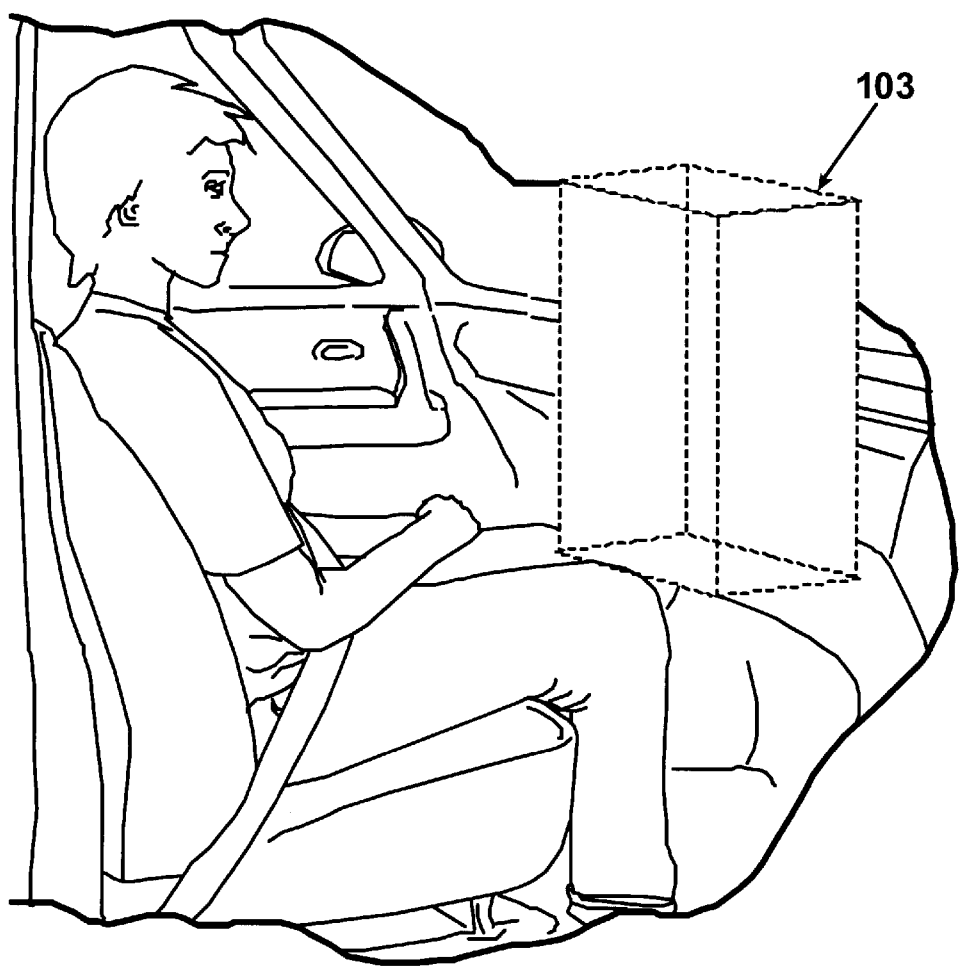
FIG. 1 is a drawing of a human passenger sitting in a vehicle, illustrating a sample airbag suppression zone.
Figure 2:
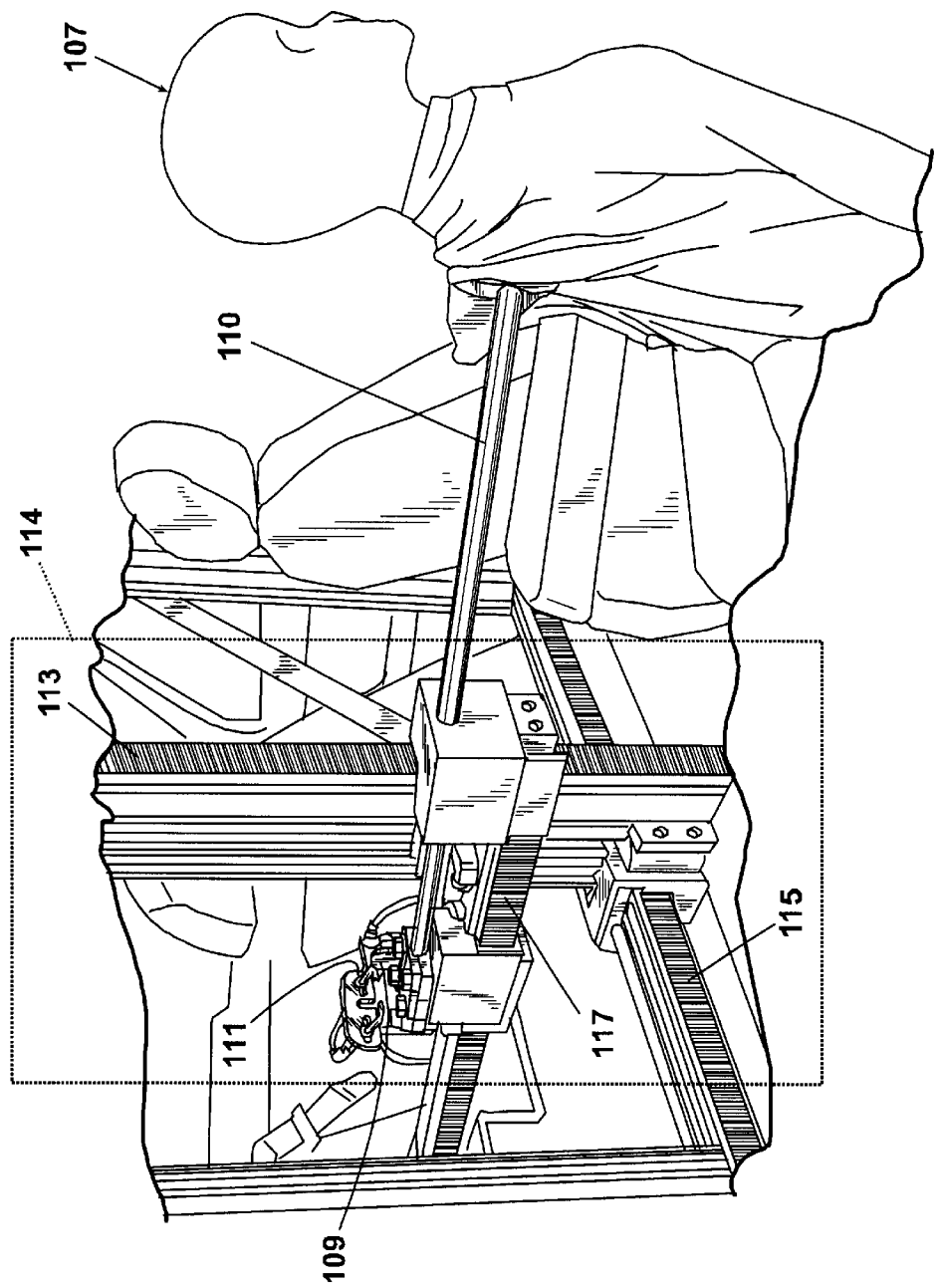
FIG. 2 illustrates a positioning system and occupant model mounted in a vehicle, according to a preferred embodiment of the invention.
Figure 3:
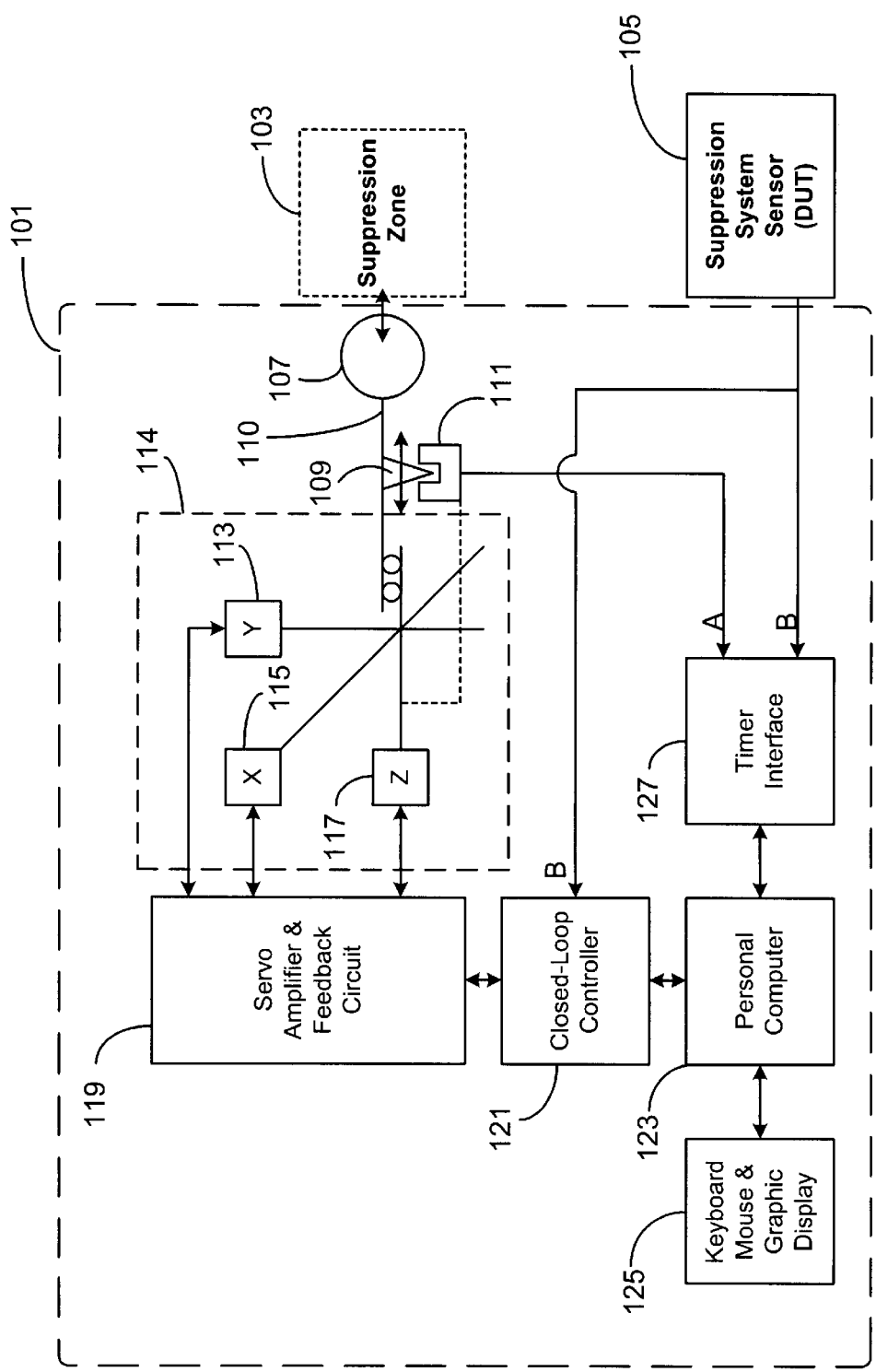
FIG. 3 is a schematic drawing of the proximity suppression system tester, according to a preferred embodiment of the invention.

Referring to FIGS. 2 and 3, a preferred embodiment 101 of the present invention is set forth. The suppression zone 103 (best shown in FIG. 1) is the area in front of the vehicle dashboard into which the airbag deploys, the size and shape of which is determined and specified by the vehicle manufacturer. The present invention is used to test the accuracy of a DPS sensor in detecting when a vehicle occupant enters the suppression zone. To do so, the present invention (i) identifies the position of an occupant model at the time when the DPS sensor detects suppression zone intrusion; and (ii) determines an "error" value indicative of a difference between when the occupant model actually enters the suppression zone and when the DPS sensor detects that the occupant model enters the suppression zone.

A DPS sensor 105 is typically mounted inside of the vehicle, though the scope of the present invention does not depend upon the manner in which the DPS sensor 105 is mounted. The DPS sensor 105 is the device under test (DUT). The DPS sensor provides control signals to an electronic airbag controller (not shown), which controls the deployment of the airbag.

A positioning system 114 is mounted inside of the vehicle, as illustrated in FIG. 2 and schematically shown in FIG. 3. The positioning system 114 comprises mechanisms for moving an object in each of the three physical dimensions. For illustration purposes, the three physical dimensions are defined by corresponding axes, and the Z-axis is defined as extending from the front of the vehicle (near the airbag) to the rear of the vehicle (near the backseat); the X-axis is defined as extending laterally across the vehicle from one side door to the other side door; and the Y-axis is defined as extending vertically from the vehicle floor to the vehicle roof. As best shown in FIG. 2, Y-axis rail 113, X-axis rail 115 and Z-axis rail 117 are preferably mounted in the vehicle to facilitate three-dimensional movement of an occupant model 107. As can best be seen in FIG. 2, X-axis rail 115 is fixedly mounted in the vehicle, and Y-axis rail 113 is slidably mounted to X-axis rail 115, which permits Y-axis rail 113 to move laterally along the X-axis from one side of the vehicle to the other. Z-axis rail 117 is slidably mounted to Y-axis rail 113, which permits Z-axis rail 117 to move vertically along the Y-axis between the vehicle floor and the vehicle roof. Actuator rod 110 is slidably mounted to the Z-axis rail 117 in such a way as to permit the actuator rod 110 to selectively extend outward from or backward into the Z-axis rail 117, thereby permitting the actuator rod 110 to move between the front and rear of the vehicle along the Z-axis. The mounting of the positioning system is calibrated relative to a fixed reference point in the vehicle so that the testing system is able to determine the position of the occupant model relative to the vehicle. Though the preferred embodiment contemplates the positioning system 114 being mounted inside of the vehicle, it is also possible, and within the scope of this invention, to modify the preferred positioning system 114 so that it can be mounted outside of the vehicle.

The occupant model 107 is fixedly mounted to an end of the actuator rod 110. The occupant model is preferably an anthropomorphic dummy that simulates a human vehicle passenger, but it may also be any other geometric object, such as a simple sphere, box, or any other object that can be sensed by the DPS sensor 105. The occupant model may be mounted to the actuator rod in such a way as to allow the occupant model to lean forward or to one side to more accurately simulate typical positions of a human occupant in the vehicle. Conventional servo motors (not shown) are connected to each of the three rails to cause the positioning system 114 to move the occupant model 107 along each of the three physical axes in response to various control signals. Thus, the occupant model 107 can be moved into the suppression zone 103 at a variety of points and from various angles. Most typically, however, the occupant model 107 is moved into the suppression zone along the Z-axis. The servo motors and related drive electronics are selected to provide acceptable acceleration and deceleration of the occupant model and acceptable errors in position.

A position marker 109 is fixedly mounted to the actuator rod 110 to act as a reference point on the actuator rod. The position marker 109 is used to provide an indication of the current position of the occupant model 107. A high-speed proximity detector 111 is slidably mounted to the Z-axis rail 117 in such a manner as to be able to detect when the position marker 109 passes by the proximity detector 111. As explained in more detail below, the proximity detector 111 creates a timing output signal in response to detecting that the position marker has passed by the detector 111. The proximity detector can be chosen from a variety of different types of sensors that are capable of high-speed detection of movement of a passing reference point. The proximity sensor 111 should be chosen so that its response time is not significant relative to the response time of the DPS sensor 105. As described in more detail below, the location at which the proximity detector 111 is positioned along the Z-axis rail 117 is calibrated so that the proximity detector 111 lines up with the position marker 109 as the occupant model 107 begins to pass into the suppression zone 103.

According to a preferred embodiment of the invention, a servo amplifier and feedback circuit 119 is connected to each of the servo motors, which together control the positioning system 114. The servo amplifier and feedback circuit 119 performs two functions. First, the amplifier portion of the circuit amplifies the power supplied to the servo motors that control the positioning system 114. Second, the feedback circuit portion receives feedback information from the positioning system relating to the current position of each of the positioning rails relative to each other. The feedback information is used to precisely control the positioning system 114.

A closed-loop controller 121, which is preferably resident in a personal computer 123, communicates with the servo amplifier and feedback circuit 119 and the DPS sensor 105 to generate motor control signals to control the positioning system 114. The closed-loop controller 121 also records data relating to occupant model position and velocity, as well as the time at which the DPS sensor 105 detects intrusion into the suppression zone. The personal computer 123, employing application-specific software, receives control commands from a human operator using conventional input devices such as a keyboard and mouse 125, and provides output information to the human operator using a conventional graphic display device 125. Other known types of control devices can be used in connection with this invention in place of a personal computer.

The personal computer 123 and application-specific software also communicate with a timer interface 127, which measures a time difference, or "error" value, between when the occupant model 107 actually enters the suppression zone 103 and when the DPS sensor 105 detects suppression zone intrusion. To do so, the timer interface 127 measures a time difference between corresponding transitions of two-state voltage signals on input lines A and B. The voltage level on input line A changes state when the proximity detector 111 detects that the position marker 109 has passed by it. The voltage level on input line B changes state when the DPS sensor 105 detects that the occupant model has passed into the suppression zone 103. The change in voltage state on input line B may lead or lag the change in voltage state on input line A. The time difference between the change in voltage state on line A and line B represents the degree of error associated with the ability of the DPS sensor to detect the precise point in time at which suppression zone intrusion occurs.

In operation, the system described above is used to measure the suppression zone boundary and degree of error associated with the DPS sensor 105 as follows. Typically, a human operator provides certain setup and control information to the application-specific software running on the personal computer 123. For example, in a preferred embodiment of the invention, a human operator is able to select between four different functions: (i) Setup Car Information; (ii) Manual Move of occupant model; (iii) Static Test; and (iv) Dynamic Test. The Setup Car Information function allows the operator to input vehicle-specific information to the system, including the vehicle identification and vehicle position reference data. The Manual Move function allows the human operator to enter a certain set of coordinates (for the X, Y, and Z axes) and cause the positioning system 114 to move the occupant model 107 to that position.

The Static Test causes the positioning system 114 to move the occupant model 107 into the suppression zone at a very slow rate, and the personal computer 123 and application-specific software identify the axial coordinates of the occupant model 107 at the point in time when it enters the suppression zone 103, as detected by the DPS sensor 105. The identified axial coordinates are used to verify that the detected suppression zone is within specified manufacturing tolerances and to calibrate the proximity detector 111 so that it passes by the proximity marker 109 at precisely the time when the occupant model 107 enters the suppression zone 103. Accordingly, the Static Test is normally performed before the Dynamic Test is performed. In a preferred embodiment of the invention, the application-specific software permits the test operator to cause multiple Static Tests from various positions and directions to be automatically performed and the data stored and analyzed in a "batch" mode.

Finally, the Dynamic Test causes the positioning system 114 to rapidly move the occupant model 107 into the suppression zone 103, simulating a situation where the vehicle is engaged in pre-impact braking prior to a crash. According to a preferred embodiment of the invention, the human operator of the test system can choose between multiple motion profiles for the occupant model 107. For example, the positioning system 114 can cause the occupant model 107 to move into the suppression zone 103 at a constant velocity, or the occupant model 107 can be moved into the suppression zone at a constant acceleration. The constant acceleration profile simulates the frictionless motion of an unbelted occupant while the vehicle is undergoing deceleration during pre-impact braking. Other motion profiles can be used as well to simulate different conditions. Preferably, the human operator can also specify the peak velocity of the occupant model, as well as the beginning and ending coordinates of the travel path.

Regardless of the particular motion profile applied, the personal computer 123 and closed-loop controller 121 issue control commands to the servo amplifier and feedback circuit 119, which in turn controls the servo motors (not shown) that actuate the various components of the positioning system 114. The positioning system 114 causes the occupant model 107 to move toward the suppression zone 103 according to one of the pre-selected motion profiles. As the occupant model 107 moves toward the suppression zone 103, the DPS sensor 105 monitors the occupant model 107 and determines when it crosses into the suppression zone 103. During this same time, the proximity sensor 111 constantly detects whether the position marker 109 has passed by it. When the position marker 109 passes the proximity sensor 111, the occupant model 107 is also passing into the suppression zone 103. In response to detecting the passing of the position marker 109, the proximity detector 111 changes the voltage state on input line A. When the DPS sensor 105 detects that the occupant model has passed into the suppression zone 103, it changes the voltage state on input line B. When the voltage state on input line B changes, the closed-loop controller 121 identifies the axial coordinates of the position of the occupant model. The timer interface 127 calculates the time difference, or "error" value, between the two changes in voltage states. The timer interface 127 provides the error value and the closed-loop controller 121 provides the occupant model position information to the personal computer 123. The information can be electronically-stored by the personal computer 123 and output to the human operator in a variety of forms, including through the graphical display device 125, hard-copy plots, or numerical listings.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A testing system for determining a performance factor of an airbag suppression system sensor, which monitors movement of a vehicle passenger into a suppression zone, comprising:

an occupant model;

a positioning system that causes controlled movement of said occupant model into the suppression zone;

a single proximity sensor, having an activation point defining an outer perimeter of the suppression zone, for detecting when said occupant model actually enters the suppression zone and generating a first output signal in response thereto; and a controller that determines the suppression system sensor performance factor based on said first output signal and a second output signal, said second output signal being generated by the suppression system sensor when said suppression system sensor detects said occupant model entering the suppression zone;

wherein the suppression system sensor performance factor is indicative of a time difference between when said single proximity sensor detects said occupant model entering the suppression zone and when the suppression system sensor detects said occupant model entering the suppression zone.

2. The system of claim 1, wherein said controller determines the suppression system sensor performance factor by calculating a difference between a change in said first output signal and a change in said second output signal.

3. The system of claim 1, further comprising a position marker associated with said occupant model; and wherein said proximity detector detects movement of said position marker to determine a point in time when said occupant model enters the suppression zone.

4. The system of claim 1, wherein said positioning system comprises a Z-axis rail.

5. The system of claim 4, wherein said positioning system further comprises an X-axis rail and a Y-axis rail.

6. The system of claim 5, wherein said Y-axis rail slides laterally across the vehicle along said X-axis rail, and said Z-axis rail slides vertically along said Y-axis rail.

7. The system of claim 1, further comprising a feedback circuit in communication with said positioning system for providing position feedback information to said controller.

8. The system of claim 1, wherein said controller is a personal computer.

9. The system of claim 1, wherein said controller includes a timer interface in communication with said proximity detector and the airbag suppression system sensor.

10. The system of claim 2, wherein said first and second signals comprise voltage levels on first and second output lines; and said first output signal change comprises a change in a state of said first voltage level and said second output signal change comprises a change in a state of said second voltage level.

11. A method of testing an airbag suppression system, comprising the steps of:
moving an occupant model toward a suppression zone;
determining a first state when said occupant model actually enters said suppression zone using a single proximity sensor having an activation point defining an outer perimeter of the suppression zone;
determining a second state when a suppression system sensor detects that said occupant model has entered said suppression zone; and
determining a performance factor of said suppression system sensor based on said first state and said second state.

12. The method of claim 11, wherein said step of determining the suppression system sensor performance factor comprises indicating a time difference between when said proximity sensor detects movement of said occupant model into the suppression zone and when the suppression system sensor detects movement of said occupant model into the suppression zone.

13. The method of claim 11, wherein said step of determining a first state comprises generating a first output signal; said step of determining a second state comprises generating a second output signal; and said step of determining a performance factor comprises calculating a difference between said first output signal and said second output signal.

14. The method of claim 11, wherein said step of determining a first state when said occupant model actually enters said suppression zone comprises a position marker associated with said occupant model, said first state realized when said position marker intercepts said outer perimeter.

15. The method of claim 11, further comprising the step of calibrating said proximity sensor and said position marker relative to each other such that said proximity sensor detects movement of said position marker when said occupant model crosses a perimeter of said suppression zone.

16. The method of claim 11, further comprising the step of selecting an occupant model movement profile, said occupant model being moved toward said suppression zone according to said movement profile.

17. The method of claim 16, wherein said step of selecting an occupant model movement profile includes selecting a movement profile that simulates constant acceleration of the occupant model.

18. The method of claim 16, wherein said step of selecting an occupant model movement profile includes selecting a movement profile that simulates constant velocity of the occupant model.

19. A method of testing an airbag suppression system, comprising the steps of:
moving an occupant model toward a suppression zone;
determining an actual position of said occupant model when the airbag suppression system detects said occupant model crossing a perimeter of said suppression zone, said suppression zone perimeter defined by an activation point of a single proximity sensor; and
comparing said actual position of said occupant model to said suppression zone perimeter.

20. The method of claim 19, further comprising the step of selecting an occupant model movement profile, said occupant model being moved toward said suppression zone according to said movement profile.

21. The method of claim 20, wherein said step of selecting an occupant model movement profile includes selecting a movement profile that simulates constant acceleration of the occupant model.

22. The method of claim 20, wherein said step of selecting an occupant model movement profile includes selecting a movement profile that simulates constant velocity of the occupant model.

23. The system of claim 1, wherein said first output signal is a reference signal and said second output signal is a test signal.

* * * * *